US009100341B2

(12) United States Patent
Bencheck et al.

(10) Patent No.: US 9,100,341 B2
(45) Date of Patent: Aug. 4, 2015

(54) METHOD AND APPARATUS FOR PROVIDING VIRTUAL CIRCUIT PROTECTION AND TRAFFIC VALIDATION

(75) Inventors: Michael U. Bencheck, Richardson, TX (US); Matthew W. Turlington, Richardson, TX (US); Vincent A. Alesi, Yorktown Heights, NY (US); William Bjorkman, Odenton, MD (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 691 days.

(21) Appl. No.: 12/980,660

(22) Filed: Dec. 29, 2010

(65) Prior Publication Data
US 2012/0170467 A1 Jul. 5, 2012

(51) Int. Cl.
*H04L 12/24* (2006.01)
*H04L 12/707* (2013.01)

(52) U.S. Cl.
CPC .............. *H04L 41/5025* (2013.01); *H04L 45/24* (2013.01)

(58) Field of Classification Search
USPC .................................................. 370/252, 389
See application file for complete search history.

(56) References Cited

U.S. PATENT DOCUMENTS

| | | | |
|---|---|---|---|
| 2003/0050096 A1* | 3/2003 | Heatley ......................... 455/560 |
| 2007/0002736 A1* | 1/2007 | Gade et al. ..................... 370/230 |
| 2007/0263532 A1* | 11/2007 | Mirtorabi et al. ............. 370/228 |
| 2007/0293242 A1* | 12/2007 | Nonaka ....................... 455/456.1 |
| 2008/0130491 A1* | 6/2008 | Chao et al. ..................... 370/225 |
| 2008/0212578 A1* | 9/2008 | Sankey et al. ................. 370/389 |
| 2008/0219268 A1* | 9/2008 | Dennison .................... 370/395.2 |
| 2009/0125617 A1* | 5/2009 | Klessig et al. ................ 709/223 |
| 2010/0074098 A1* | 3/2010 | Zeng et al. ..................... 370/217 |
| 2010/0226253 A1* | 9/2010 | Bugenhagen ................ 370/236 |
| 2011/0096670 A1* | 4/2011 | Cheng et al. ................ 370/241.1 |
| 2012/0147893 A1* | 6/2012 | Shabtay et al. .......... 370/395.53 |

* cited by examiner

*Primary Examiner* — Brandon Renner

(57) ABSTRACT

An approach provides virtual circuit protection. Traffic is received at a network interface device configured to interface an Ethernet virtual circuit of a service provider transport network over a user network interface (UNI). The network interface device is configured as a demarcation point between a customer network and the service provider transport network. Circuit replication is performed over the virtual circuit to create a plurality of communication paths over the virtual circuit by assigning respective tags for independently switching the traffic over the communication paths. One of the communication paths is designated as a standby communication path.

17 Claims, 10 Drawing Sheets

METHOD AND APPARATUS FOR PROVIDING VIRTUAL CIRCUIT PROTECTION AND TRAFFIC VALIDATION

BACKGROUND INFORMATION

Modern communication networks are growing in size and complexity. Given the highly competitive nature of the telecommunications industry, network service providers are increasingly relying on network performance as a key differentiator for delivering communication services. As the number of subscribers (e.g., customers) increases and services evolve in sophistication, the performance of these networks can degrade, in part, from constraints of the network equipment. In many instances, the impact of network failures or even lapses in network performance can result in substantial monetary losses. Consequently, the ability to assess and improve upon network performance is a critical business component for service providers. Moreover, customers are demanding greater resiliency in the services they purchase from a service provider. There are many levels of resiliency including transport, network element and circuit resiliency. The most resilient service offers two transport connections to the customer and carries circuits on diverse elements and transport throughout the network. However, this is expensive for the service provider and the customer.

Therefore, there is a need for an approach to cost-effectively provide network resiliency, while permitting ease of network diagnosis.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF THE PREFERRED EMBODIMENT

A preferred method and apparatus for providing virtual circuit protection and traffic validation is described. In the following description, for the purposes of explanation, numerous specific details are set forth in order to provide a thorough understanding of the preferred embodiments of the invention. It is apparent, however, that the preferred embodiments may be practiced without these specific details or with an equivalent arrangement. In other instances, well-known structures and devices are shown in block diagram form in order to avoid unnecessarily obscuring the preferred embodiments of the invention.

Although various exemplary embodiments are described with respect to the Ethernet protocol, it is contemplated that these embodiments have applicability to other frame-based networking protocol and technologies.

Figure 1A:
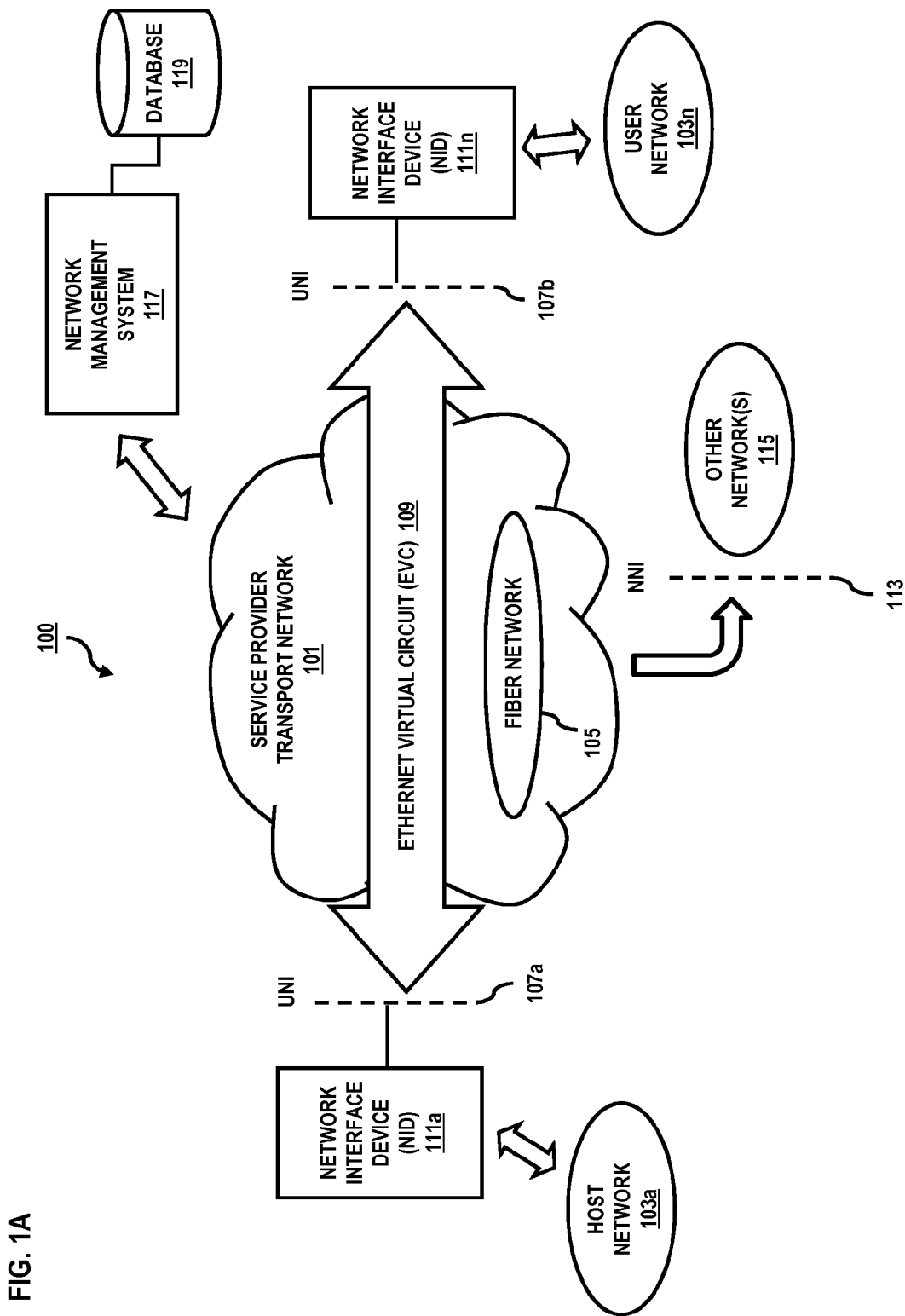
FIGS. 1A-1C are diagrams of a communication system utilizing network interface devices (NIDs) to provide protected virtual circuits, according to various embodiments.
Figure 1B:
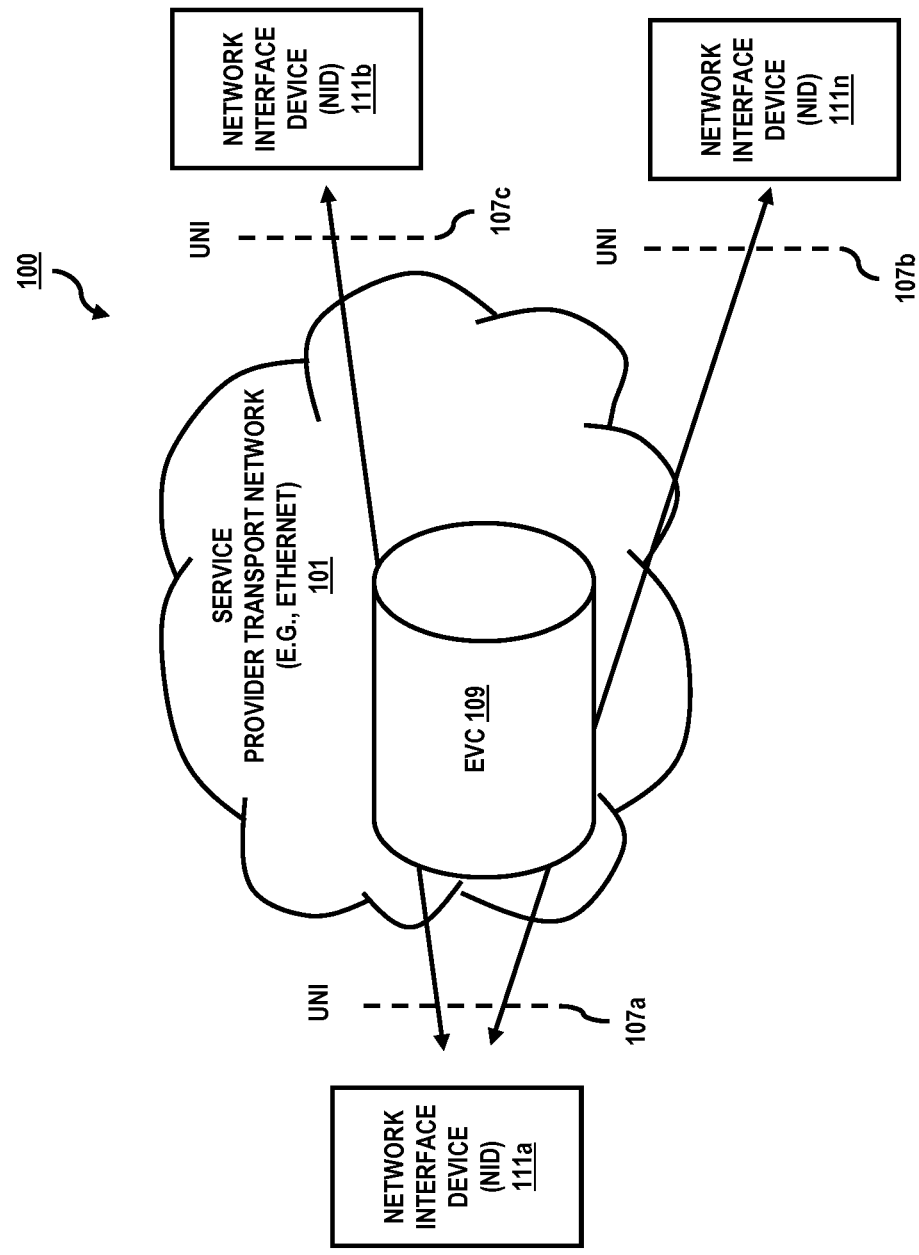
Figure 1C:
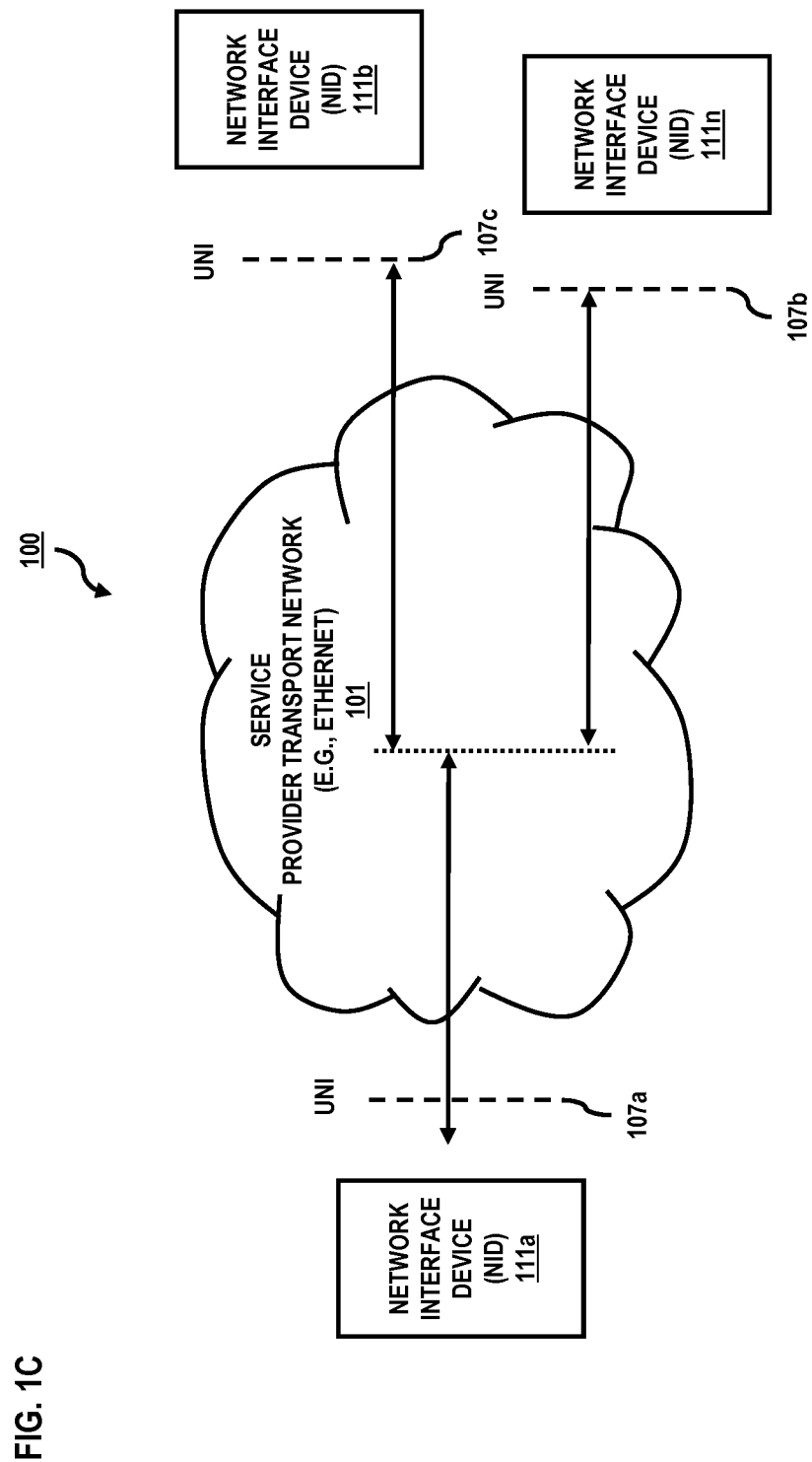

FIGS. 1A-1C are diagrams of a communication system utilizing network interface devices (NIDs) to provide protected virtual circuits, according to various embodiments. For the purposes of illustration, system 100 includes a transport network 101 that employs a frame-based data networking technology, such as Ethernet, to provide connectivity among user networks 103a-103n (of which two networks are shown). According to certain embodiments, the transport network 101 provides switched Ethernet services over a fiber network 105 (e.g., Synchronous Optical Network (SONET), Dense Wavelength Division Multiplexing (DWDM), etc.), supporting native local area network (LAN) speeds and standard Ethernet interfaces of, e.g., 10 Mbps, 100 Mbps, 1 Gbps and/or 10 Gbps Ethernet. The use of Ethernet technology by transport network 101 is advantageous in that Ethernet technology is pervasive as a LAN option, thereby providing reduced cost of operations, administration, and management (OAM). According to one embodiment, the transport network 101 is managed by a service provider, which may act as a wholesaler of telecommunication services, to other retail providers, such as content service providers, Internet service providers, application service providers, etc. Under the scenario of FIG. 1A, transport network 101 supplies a variety of Ethernet services and offers protection at a virtual circuit level. User networks 103a-103n (including a host user, serving as a retail provider) connect to the transport network 101 over interfaces denoted as a User-Network Interface (UNI) 107a, 107b.

As shown, one or more Ethernet Virtual Circuits (EVCs) 109 can be established over the transport network 101. Each EVC 109 associates two or more UNIs 107a, 107b to transport Ethernet frames over the transport network 101. The EVCs 109 provides isolation of traffic as to prevent transfer of traffic among user premises that are not part of the same EVC 109. In this manner, EVCs 109 advantageously ensure privacy and security in the delivery of Ethernet traffic. With the EVCs 109, the Ethernet frames are unaltered from the source to the destination. In effect, EVCs 109 can be used to provide Layer 2 private or Virtual Private Network (VPN) services.

According to one embodiment, transport network 101 utilizes a network interface device (NID) 111a, 111n, on the end user's premises as the demarcation point between the transport network 101 and the end user's network (e.g., networks 103a, 103n). For example, the NID can define the boundary between the "inside wiring" of the user premise with the facilities (outside wiring) of the service provider. In an Ethernet service, a NID traditionally is implemented as a two port bridge with no means of providing virtual circuit protection.

The transport network 101 provides a new multi-port (e.g., 2-ports) NID 111 that offers specific circuit replication. As discussed, the NID 111 receives customer frames on the UNI 107 for transmission to a destination NID. If an Ethernet Virtual Circuit (EVC) 109 is to be replicated, the NID 111 provides Virtual LAN (VLAN) tags on members of the protected EVC to create two duplicate streams in the same EVC. The streams are egressed out of the NID 111a towards the transport network to the destination NID 111b. The members can then be switched independently throughout the service provider's network 101. This arrangement gives the ability to provide protection to the customer without requiring duplicated transport to the customer, thereby saving network sources (and thus reduce costs). Also, the transport network 101 allows the capability to monitor the performance of both members of the EVC 109 from NID 111a to NID 111n.

Although the approach has been described with respect to the UNI interface, the approach has applicability to a Network-to-Network Interface (NNI) 113, which can be provided to link user networks across substantial distances (e.g., hundreds of miles). The protection can be provided from UNI 107 to NNI 113. The NNI 113 permits connectivity to any other type of network(s) 115. In system 100, according to certain embodiments, such networks can include a data network, telephony network, and/or wireless network to handle various communication sessions. For example, telephony network may include a circuit-switched network, such as the public switched telephone network (PSTN), an integrated services digital network (ISDN), a private branch exchange (PBX), or other like network. Wireless network may employ various technologies including, for example, code division multiple access (CDMA), enhanced data rates for global evolution (EDGE), general packet radio service (GPRS), mobile ad hoc network (MANET), global system for mobile communications (GSM), Internet protocol multimedia subsystem (IMS), universal mobile telecommunications system (UMTS), etc., as well as any other suitable wireless medium, e.g., microwave access (WiMAX), wireless fidelity (WiFi), long term evolution (LTE), satellite, and the like. Meanwhile, data network may be any local area network (LAN), metropolitan area network (MAN), wide area network (WAN), the Internet, or any other suitable packet-switched network, such as a commercially owned, proprietary packet-switched network, such as a proprietary cable or fiber-optic network.

In certain embodiments, the Ethernet services of the transport network 101 can be classified as a point-to-point service and a multi-point-to-multi-point service. For example, according to the Metro Ethernet Forum, the point-to-point service is referred to as an Ethernet Line (E-Line) service type, while the multi-point-to-multi-point service is denoted Ethernet LAN (E-LAN) type. FIG. 1B illustrates the point-to-point service, whereby UNIs 107a-107c are connected through a single EVC 109. However, multiple EVCs can be established over the same physical port at the NID 111. With the E-LAN (shown in FIG. 1C), or multi-point-to-multi-point service, service multiplexing can be provided at anyone of the UNIs 107.

The EVCs can be configured according to a range of performance parameters that provide no guarantees of delivery (best effort) to some assurance of service quality: Committed Information Rate (CIR), Committed Burst Size (CBS), Excess Information Rate (EIR), Excess Burst Size (EBS) as well as delay, jitter, and loss. With proper configuration of these parameters, point-to-point EVCs can be implemented as private leased line service. These network performance parameters can be monitored by a network management system 117.

Network management system 117 can monitor the transport network 101, collecting usage data, and analyzing the usage data to detect problems associated with, for example, Service Level Agreement (SLA) requirements, Quality of Service (QoS) guarantees, etc. The network management system 117 can interface with or incorporate a data repository 119 that is used to store usage (traffic) data collected by the network management system 117 from the transport network 101. When a particular requirement is not met or usage crosses a set threshold, it signifies a failure and corrective action(s) needs to be taken. Depending upon the detected problem and the network resources available, there could be multiple choices of corrective actions, some of which could be simple, while others could be more involved, for example, by requiring extensive changes to the current network configuration.

In exemplary embodiments, network management system 117 monitors network traffic associated with one or more NIDs 111 of transport network 101. Monitoring may be performed over any suitable time interval, which may be predefined and/or configured by, for example, a network administrator. For instance, a configurable time interval may be established for monitoring network traffic over several seconds, minutes, hours, days, etc. In this manner, the network traffic of a customer (as well as an end user) may be monitored before and after traffic shaping, as well as before and after traffic policing. According to one embodiment, network traffic information can be analyzed in real-time (i.e., as the information is generated or collected), on a periodic basis (e.g., after a predetermined time period, such as at the conclusion of one or more subintervals, or the conclusion of the configurable time interval), or in an "on-demand" fashion (i.e., when requested by a network administrator). Also, network management system 117 can utilize rule-based logic to measure a traffic rate or determine various traffic statistics associated with a source (e.g., NID 111a), such as an average active rate of transmission, an average rate of transmission, a maximum burst duration, a maximum burst length, a maximum burst rate, or any other suitable parameter. Network management system 117 may also acquire one or more committed rates of service from data repository 119. As such, network management system 117 may be configured to compare a received committed rate of service with one or more of the measured rates or traffic statistics in order to determine a committed rate of service overage, a maximum excess byte count, etc. This enables network management system 117 to determine whether a customer is conforming to their SLA.

The above arrangement provides a methodology for replicating data traffic in, for example, a two port NID and tagging the members of the EVC so that they can be switched independently, as detailed below with respect to FIG. 2.

Figure 2:
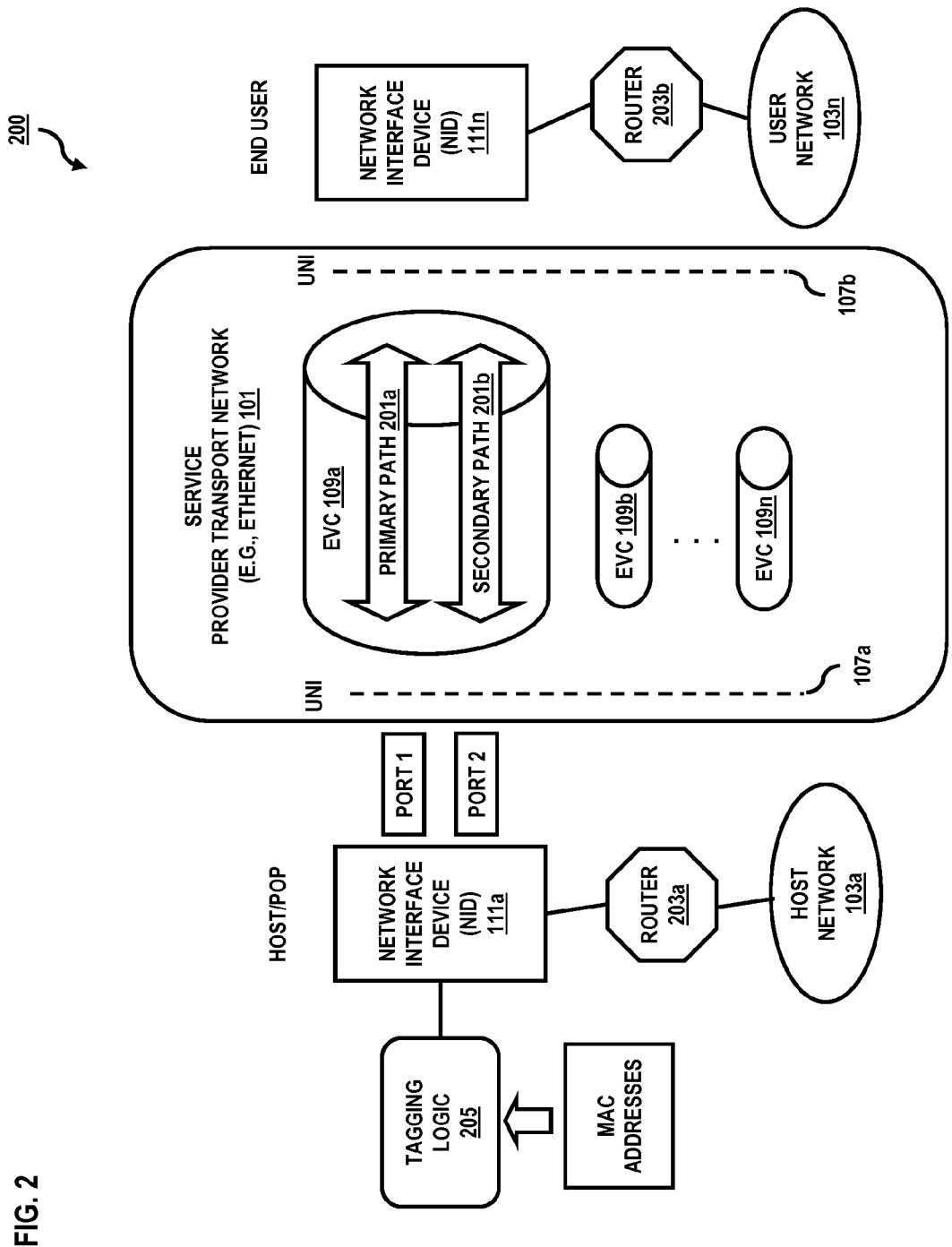
FIG. 2 is a diagram of the system of FIG. 1A utilizing an network interface device (NID) configured to establish multiple communication paths over an Ethernet Virtual Circuit (EVC), according to one embodiment.

FIG. 2 is a diagram of the system of FIG. 1A utilizing an network interface device (NID) configured to establish multiple communication paths over an Ethernet Virtual Circuit (EVC), according to one embodiment. In certain embodiments, the transport network 101 supports a mechanism for the NID 111 to use the far end MAC addresses that are learned to facilitate the switching of traffic from one path to the other path. As shown, NID 111a has two ports, Port 1 and Port 2, that connect to one or more EVCs 109a-109n over the UNI 107a, whereby the EVC 109a, as the protected EVC, provides a primary communication path 201a and a secondary communication path 201b. For example, Port 1 is utilized for egress traffic towards the network 101. The NID 111a learns the MAC addresses of the two routers 203a, 203b on the two paths 201a, 201b. The NID 111a uses these MAC addresses as the destination MAC address. When one path fails (e.g., primary path 201a), the NID 111a will use the "standby" MAC address to transmit the traffic onto the secondary path 201b. The MAC addresses are processed using tagging logic 205. The operation of system 100 is more fully detailed with respect to FIGS. 4-6.

Figure 7:
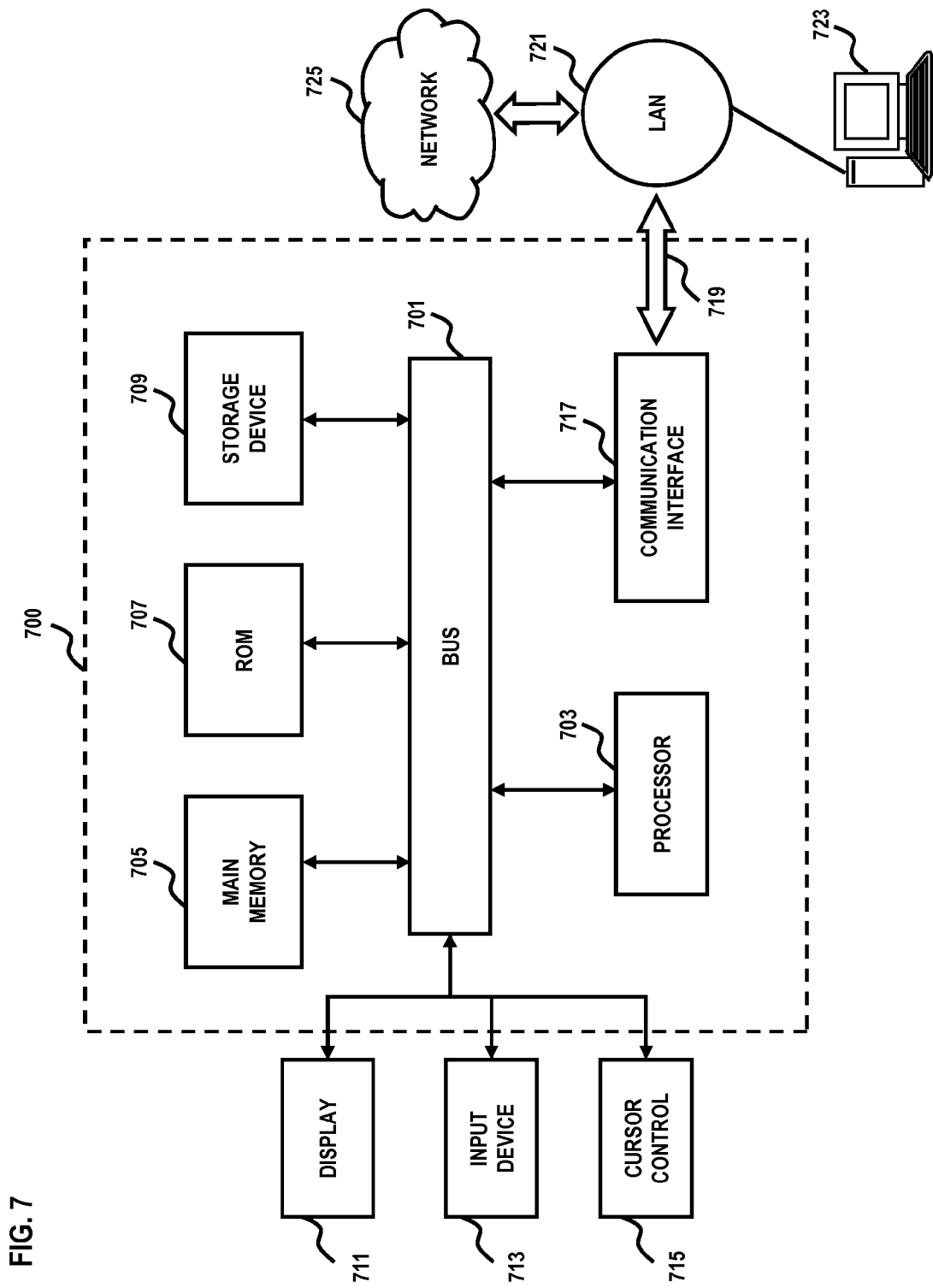
FIG. 7 is a diagram of a computer system that can be used to implement various exemplary embodiments.

With respect to routers 203a, 203b, these network devices operate at the physical layer, link layer and network layer of the open systems interconnection (OSI) model to transport data across the network 101. For example, the routers 203a, 203b can behave as an edge router to the transport network 101. In general, the routers 203a, 203b can determine the "best" paths or routes by utilizing various routing protocols. Routing tables are maintained by each router 203a, 203b for mapping input ports to output ports using information from routing protocols. Exemplary routing protocols include border gateway protocol (BGP), interior gateway routing protocol (IGRP), routing information protocol (RIP), and open shortest path first (OSPF). In addition to intelligently forwarding data, the routers 203a, 203b can provide various other functions, such as firewalling, encryption, etc. These router functions can be performed using a general purpose computer (e.g., as shown in FIG. 7), or a highly specialized hardware platform with greater processing capability to process high volumes of data and hardware redundancies to ensure high reliability.

To better appreciate the replication of data traffic to enable greater resiliency in the network, it is instructive to examine the use of tags in a typical Ethernet frame, as next explained.

Figure 3:
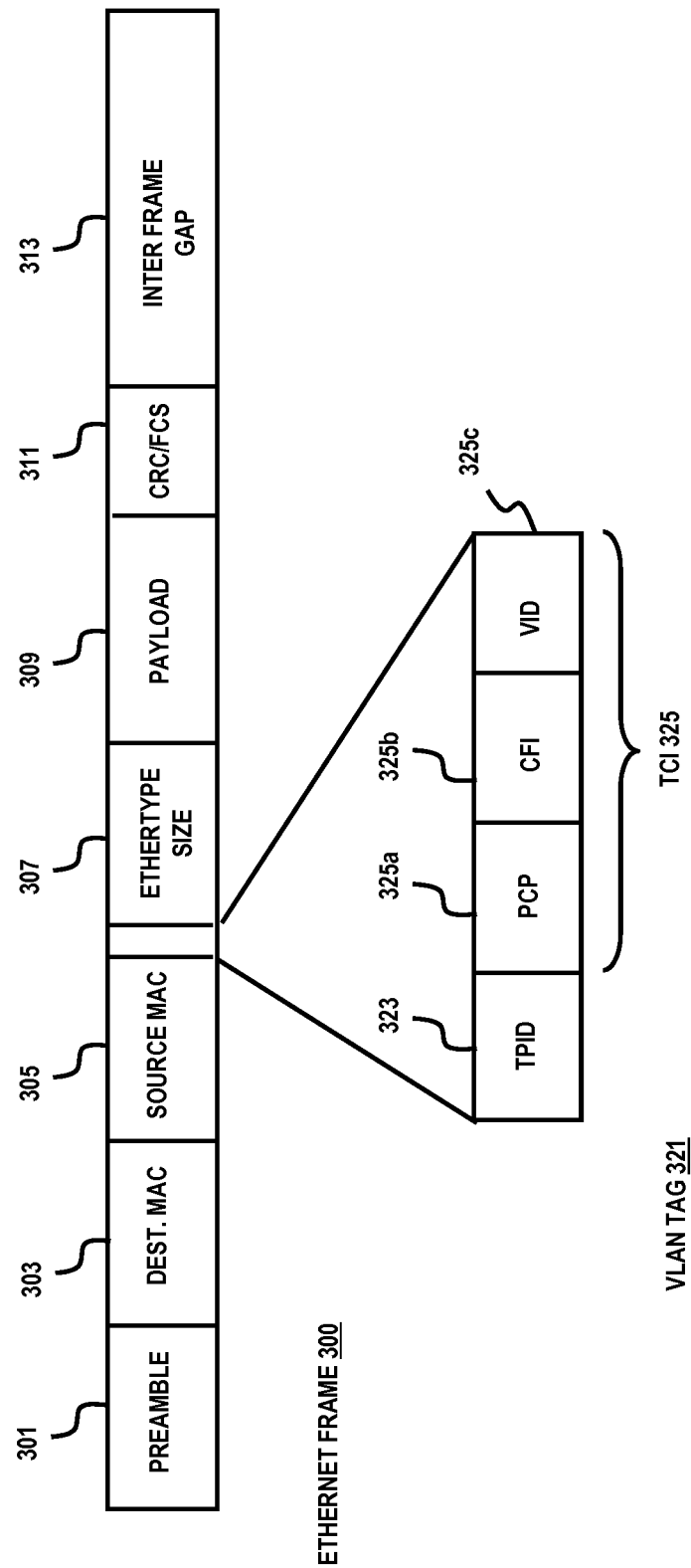
FIG. 3 is a diagram of an Ethernet frame supporting Virtual Local Area Network (VLAN) tagging, according to one embodiment.

FIG. 3 is a diagram of an Ethernet frame supporting Virtual Local Area Network (VLAN) tagging, according to one embodiment. By way of example, an Ethernet II frame 300 is described, whereby a VLAN tag is utilized. VLAN tagging, which is an Institute of Electrical and Electronics Engineers (IEEE) 802.1Q standard, enables the creation of multiple independent logical networks within a common physical Ethernet network link. This standard defines a capability to communicate over different virtual LANs through a Layer 3 (Network Layer) switch.

Ethernet, which is defined in IEEE 802.3, in general is a LAN protocol that employs persistent carrier sense multiple access (CSMA) and collision detection. For example, devices on an Ethernet LAN can transmit without needing to schedule such transmissions in advance. The transmission scheme is simple in that if packets or frames collide (i.e., the transmission of another device on the LAN is in conflict), each device waits a random time and tries again.

As shown, the Ethernet II frame 300 includes the following fields, as enumerated in Table 1:

TABLE 1

| FIELD | DESCRIPTION |
| --- | --- |
| Preamble 301 | Includes a pattern of bits for synchronization |
| Destination MAC 303 | Destination Media Access Control address |
| Source MAC 305 | Source Media Access Control address |
| Ethertype Size 307 | Used to indicate which protocol is encapsulated in the payload |
| Payload 309 | Stores 46-1500 octets of data |
| CRC/FCS 311 | Cyclic Redundancy Check/Frame Check Sequence for error detection |
| Interframe GAP 313 | A minimum of 12 octets of idle line state until transmission of the next frame |

A 802.1Q or VLAN tag 321 is inserted between the Source MAC address field 305 and the Ethertype field 307. Within the VLAN tag 321, two bytes are used for the tag protocol identifier (TPID) 323. The tag control information (TCI) 325 also is two bytes in length. The TCI field 325 is further divided into the following (Table 2):

TABLE 2

| Field | Description |
| --- | --- |
| Tag Protocol Identifier (TPID) 323 | A 16-bit field set to a value of 0x8100 to identify the frame as an IEEE 802.1Q-tagged frame. |

TABLE 2-continued

| Field | Description |
| --- | --- |
| Priority Code Point (PCP) 325a | A 3-bit field to indicate the frame priority level. |
| Canonical Format Indicator (CFI) 325b | A 1-bit field to indicate whether the MAC address is in non-canonical format, or in canonical format. |
| VLAN Identifier (VID) 325c | A 12-bit field specifying the VLAN to which the frame belongs. |

Although the above Ethernet frame format is described, it is contemplated that other equivalent frame formats can be utilized by the NIDs 111a-111n.

Figure 4:
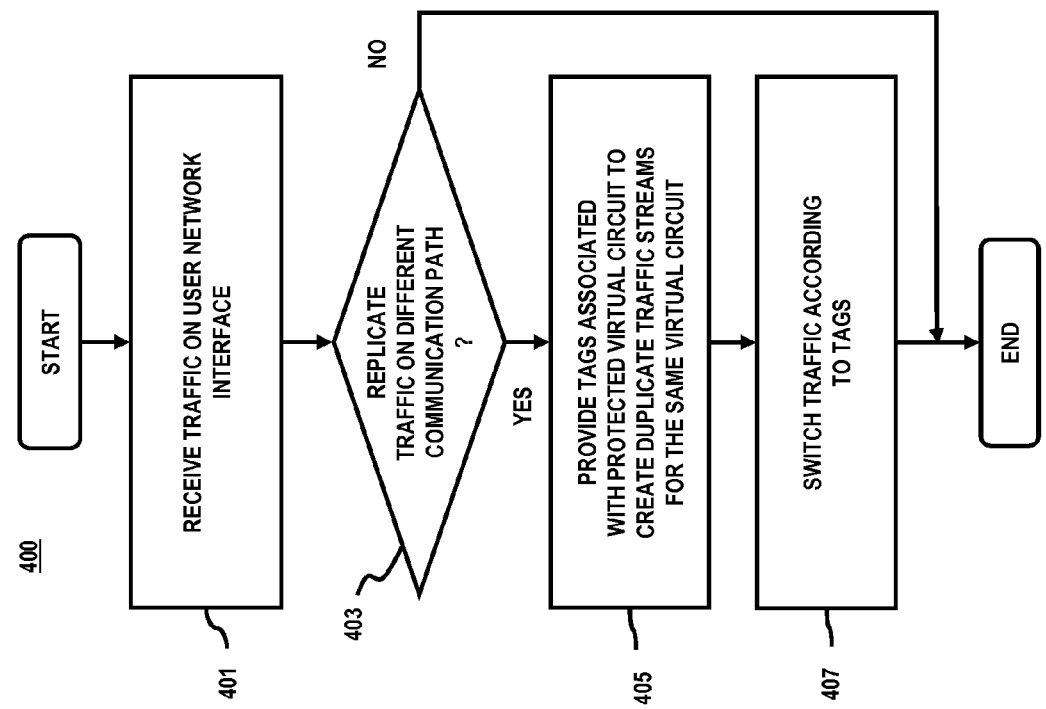
FIG. 4 is a flowchart of a process for providing protected virtual circuits using VLAN tagging, according to one embodiment.

FIG. 4 is a flowchart of a process for providing protected virtual circuits using VLAN tagging, according to one embodiment. Process 400 provides virtual circuit protection at the NID level. In step 401, traffic is received on the user network interface, for example, at NID 111a (of FIG. 2), which then determines whether to replicate the traffic over different communication paths 201a, 201b (per step 403). If replication is needed, NID 111a via tagging logic 205, generates, as in step 405, appropriate tags associated with the protected virtual circuit to create duplicate traffic streams for the same virtual circuit 109a. That is, these tags are then inserted into the traffic streams accordingly. Next, in step 407, NID 111a can then switch the traffic according to the tags for transport over either of the communication paths 201a, 201b.

Process 400, in one embodiment, involves the use of Media Access Control (MAC) addresses, whereby one or more such addresses are used to designated the secondary or standby path, as next explained.

Figure 5:
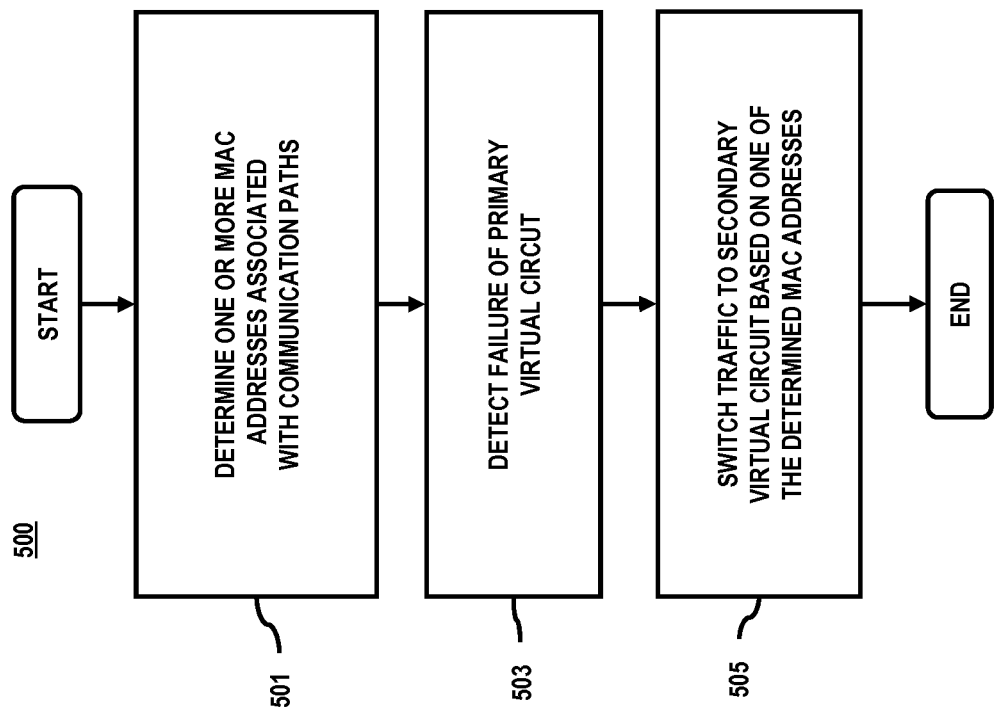
FIG. 5 is a flowchart of a process for switching traffic to a secondary (or standby) path using Media Access Control (MAC) addresses, according to one embodiment.

FIG. 5 is a flowchart of a process for switching traffic to a secondary (or standby) path using Media Access Control (MAC) addresses, according to one embodiment. In this example, process 500 permits usage of MAC addresses for switching over the communication paths 201a, 201b of the protected EVC 109. In step 501, the MAC addresses associated with the communication paths 201a, 201b are determined using, for example, the routers 203a, 203b within the path to acquire the information. Assuming the protected EVC 109a experiences a failure in the primary path 201a; such failure can be detected by NID 111a, as in step 503. As a result, NID 111a initiates, per step 505, the switching of traffic from the failed path 201a to the secondary (or standby) path 201b using the determined MAC addresses.

The use of NIDs 111a within the premises of the customer or user can also permit more sophisticated network monitoring.

Figure 6B:
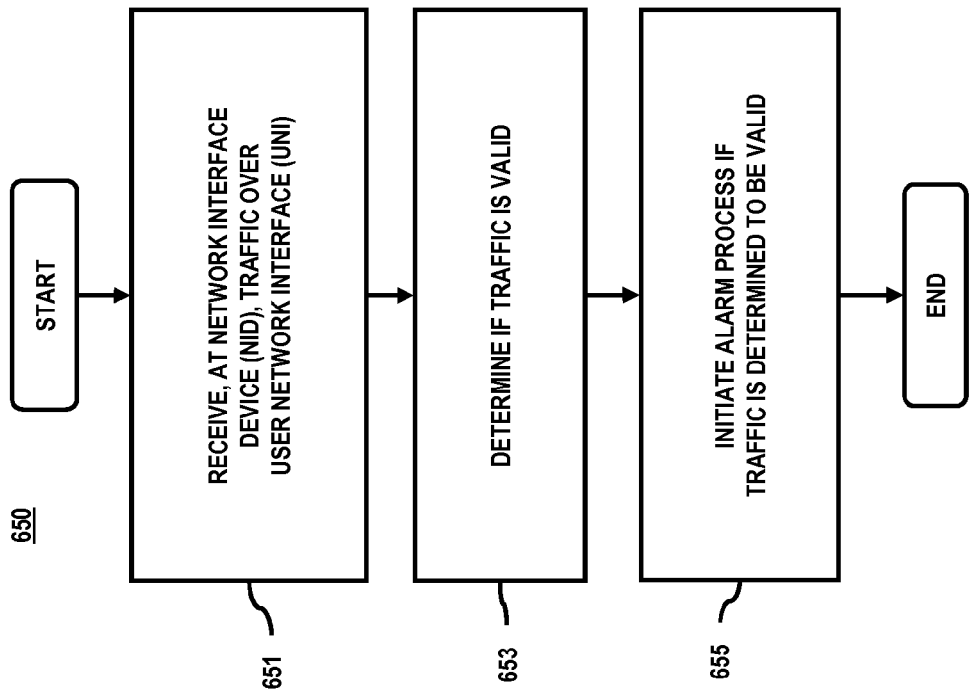
FIGS. 6A and 6B are diagrams of monitoring and alarm processes, according to various embodiments.
Figure 6A:
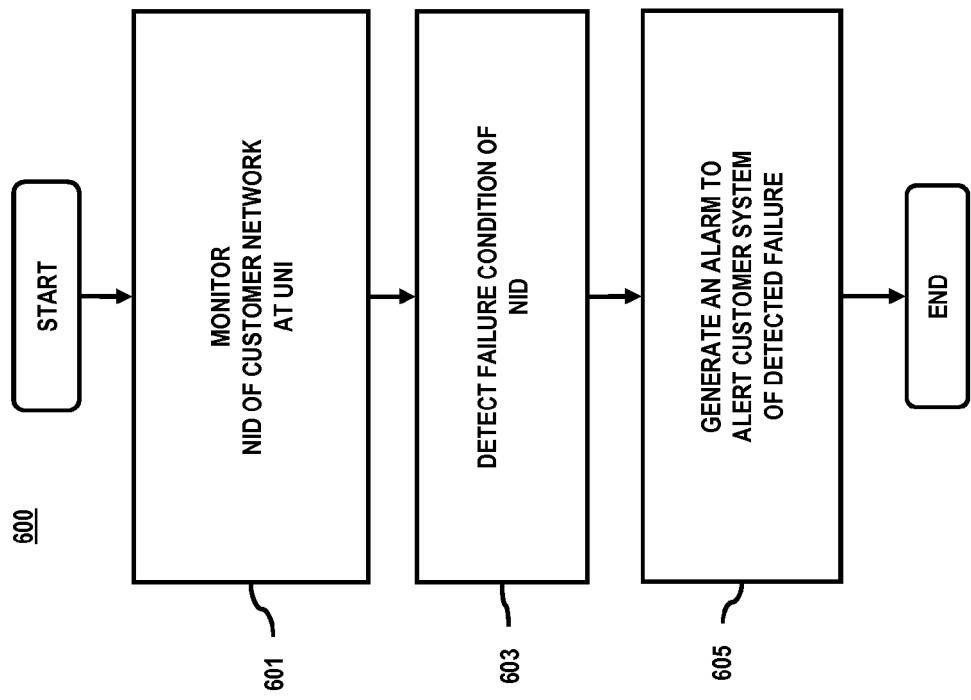

FIGS. 6A and 6B are diagrams of monitoring and alarm processes, according to various embodiments. By deploying the NID at the user premises, network transparency is expanded over traditional approaches. As shown in FIG. 6A, process 600 provides for monitoring of the network service to the customer. For example, the service provider of the transport network 101 can monitor the NID 111a of the customer (e.g., host user) at the UNI 107a, per step 601. A failure condition, such as loss of signal on any one of the ports (e.g., Port 1 or Port 2), can be detected, as in step 603. In step 605, in response to the detected failure, the service provider, via, e.g., network management system 117 can generate an alarm to alert the customer system (which may be also be a network management system controlled by the host user) of the detected failure.

Under this scenario, process 650 can be executed by NID 111a to determine whether traffic across the UNI 107a is valid before executing an alarm process or a procedure to collect network performance data. Such performance data collection can be executed by network management system 117 in response to this verification. In step 651, traffic is received by NID 111a via the UNI 107a. NID 111a then determines validity of the traffic, per step 653. In one embodiment, this determination is based on customer information and/or service level agreement (SLA) parameters. If the traffic is valid, the NID 111a initiates an alarm process (step 655).

The above processes of FIGS. 4-6 advantageously, according to certain embodiments, enable virtual circuit protection at the NID level. This capability avoids the high cost of maintaining multiple transport connections to achieve network resiliency. Also, such network transparency enhances network management functions to more efficiently utilize network resources.

The processes described herein for providing protected virtual circuits may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

FIG. 7 is a diagram of a computer system that can be used to implement various exemplary embodiments. The computer system 700 includes a bus 701 or other communication mechanism for communicating information and one or more processors (of which one is shown) 703 coupled to the bus 701 for processing information. The computer system 700 also includes main memory 705, such as a random access memory (RAM) or other dynamic storage device, coupled to the bus 701 for storing information and instructions to be executed by the processor 703. Main memory 705 can also be used for storing temporary variables or other intermediate information during execution of instructions by the processor 703. The computer system 700 may further include a read only memory (ROM) 707 or other static storage device coupled to the bus 701 for storing static information and instructions for the processor 703. A storage device 709, such as a magnetic disk or optical disk, is coupled to the bus 701 for persistently storing information and instructions.

The computer system 700 may be coupled via the bus 701 to a display 711, such as a cathode ray tube (CRT), liquid crystal display, active matrix display, or plasma display, for displaying information to a computer user. An input device 713, such as a keyboard including alphanumeric and other keys, is coupled to the bus 701 for communicating information and command selections to the processor 703. Another type of user input device is a cursor control 715, such as a mouse, a trackball, or cursor direction keys, for communicating direction information and command selections to the processor 703 and for adjusting cursor movement on the display 711.

According to an embodiment of the invention, the processes described herein are performed by the computer system 700, in response to the processor 703 executing an arrangement of instructions contained in main memory 705. Such instructions can be read into main memory 705 from another computer-readable medium, such as the storage device 709. Execution of the arrangement of instructions contained in main memory 705 causes the processor 703 to perform the process steps described herein. One or more processors in a multi-processing arrangement may also be employed to execute the instructions contained in main memory 705. In alternative embodiments, hard-wired circuitry may be used in place of or in combination with software instructions to implement the embodiment of the invention. Thus, embodiments of the invention are not limited to any specific combination of hardware circuitry and software.

The computer system 700 also includes a communication interface 717 coupled to bus 701. The communication interface 717 provides a two-way data communication coupling to a network link 719 connected to a local network 721. For example, the communication interface 717 may be a digital subscriber line (DSL) card or modem, an integrated services digital network (ISDN) card, a cable modem, a telephone modem, or any other communication interface to provide a data communication connection to a corresponding type of communication line. As another example, communication interface 717 may be a local area network (LAN) card (e.g. for Ethernet™ or an Asynchronous Transfer Model (ATM) network) to provide a data communication connection to a compatible LAN. Wireless links can also be implemented. In any such implementation, communication interface 717 sends and receives electrical, electromagnetic, or optical signals that carry digital data streams representing various types of information. Further, the communication interface 717 can include peripheral interface devices, such as a Universal Serial Bus (USB) interface, a PCMCIA (Personal Computer Memory Card International Association) interface, etc. Although a single communication interface 717 is depicted in FIG. 5, multiple communication interfaces can also be employed.

The network link 719 typically provides data communication through one or more networks to other data devices. For example, the network link 719 may provide a connection through local network 721 to a host computer 723, which has connectivity to a network 725 (e.g. a wide area network (WAN) or the global packet data communication network now commonly referred to as the "Internet") or to data equipment operated by a service provider. The local network 721 and the network 725 both use electrical, electromagnetic, or optical signals to convey information and instructions. The signals through the various networks and the signals on the network link 719 and through the communication interface 717, which communicate digital data with the computer system 700, are exemplary forms of carrier waves bearing the information and instructions.

The computer system 700 can send messages and receive data, including program code, through the network(s), the network link 719, and the communication interface 717. In the Internet example, a server (not shown) might transmit requested code belonging to an application program for implementing an embodiment of the invention through the network 725, the local network 721 and the communication interface 717. The processor 703 may execute the transmitted code while being received and/or store the code in the storage device 709, or other non-volatile storage for later execution. In this manner, the computer system 700 may obtain application code in the form of a carrier wave.

The term "computer-readable medium" as used herein refers to any medium that participates in providing instructions to the processor 703 for execution. Such a medium may take many forms, including but not limited to computer-readable storage medium ((or non-transitory)—i.e., non-volatile media and volatile media), and transmission media. Non-volatile media include, for example, optical or magnetic disks, such as the storage device 709. Volatile media include dynamic memory, such as main memory 705. Transmission media include coaxial cables, copper wire and fiber optics, including the wires that comprise the bus 701. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

Figure 8:
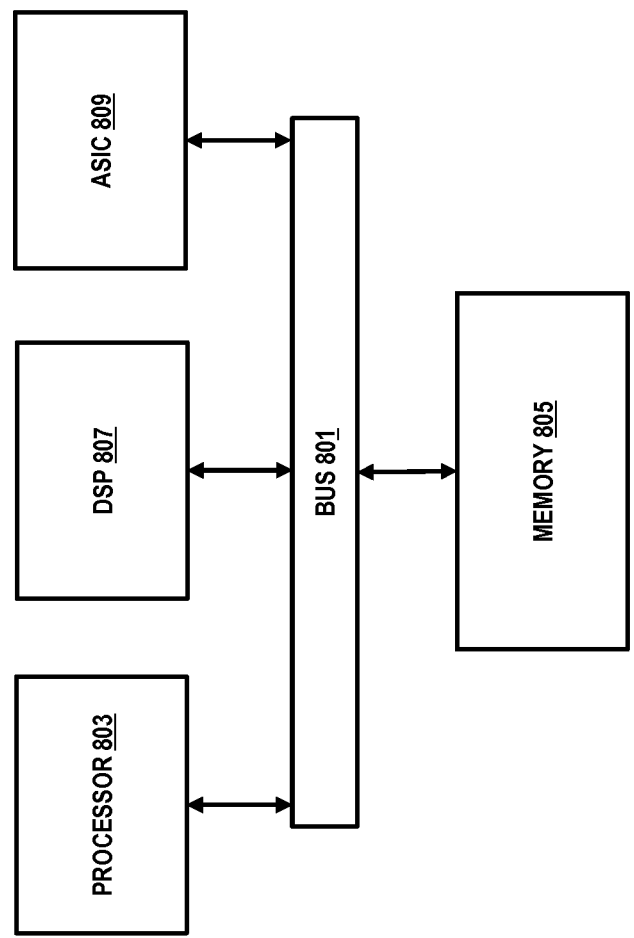
FIG. 8 is a diagram of a chip set that can be used to implement an embodiment of the invention.

FIG. 8 illustrates a chip set or chip 800 upon which an embodiment of the invention may be implemented. Chip set 800 is programmed to configure a mobile device to enable accident detection and notification functionality for use within a vehicle as described herein and includes, for instance, the processor and memory components described with respect to FIG. 7 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 800 can be implemented in a single chip. It is further contemplated that in certain embodiments the chip set or chip 800 can be implemented as a single "system on a chip." It is further contemplated that in certain embodiments a separate ASIC would not be used, for example, and that all relevant functions as disclosed herein would be performed by a processor or processors. Chip set or chip 800, or a portion thereof, constitutes a means for performing one or more steps of providing user interface navigation information associated with the availability of functions. Chip set or chip 800, or a portion thereof, constitutes a means for performing one or more steps of FIGS. 4-6.

In one embodiment, the chip set or chip 800 includes a communication mechanism such as a bus 801 for passing information among the components of the chip set 800. A processor 803 has connectivity to the bus 801 to execute instructions and process information stored in, for example, a memory 805. The processor 803 may include one or more processing cores with each core configured to perform independently. A multi-core processor enables multiprocessing within a single physical package. Examples of a multi-core processor include two, four, eight, or greater numbers of processing cores. Alternatively or in addition, the processor 803 may include one or more microprocessors configured in tandem via the bus 801 to enable independent execution of instructions, pipelining, and multithreading. The processor 803 may also be accompanied with one or more specialized components to perform certain processing functions and tasks such as one or more digital signal processors (DSP) 807, or one or more application-specific integrated circuits (ASIC) 809. A DSP 807 typically is configured to process real-world signals (e.g., sound) in real time independently of the processor 803. Similarly, an ASIC 809 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 800 includes merely one or more processors and some software and/or firmware supporting and/or relating to and/or for the one or more processors.

The processor 803 and accompanying components have connectivity to the memory 805 via the bus 801. The memory 805 includes both dynamic memory (e.g., RAM, magnetic disk, writable optical disk, etc.) and static memory (e.g., ROM, CD-ROM, etc.) for storing executable instructions that when executed perform the inventive steps described herein to configure a mobile device to enable accident detection and notification functionality for use within a vehicle. The memory 805 also stores the data associated with or generated by the execution of the inventive steps.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
    receiving traffic at a network interface device configured to interface an Ethernet virtual circuit of a service provider transport network over a user network interface (UNI), wherein the network interface device is configured as a demarcation point between a customer network and the service provider transport network;
    performing circuit replication over the virtual circuit to create a plurality of communication paths over the virtual circuit by assigning respective tags to create duplicate traffic streams for the virtual circuit,
    wherein the plurality of communication paths of the virtual circuit are associated with a common network interface device on both a transmission side and a destination side,
    wherein the tags are inserted into the duplicate traffic streams for independently switching the duplicate traffic streams over the plurality of communication paths of the virtual circuit,
    wherein the plurality of communication paths of the virtual circuit connect to a host network via a first single common router on a host side, and connect to a user network via second common router on an end user side.

2. The method according to claim 1, further comprising:
    detecting, at the network user interface, whether the traffic is valid traffic for a particular customer; and
    initiating an alarm process if the traffic is valid.

3. The method according to claim 2, further comprising:
    monitoring one or more ports of the network user interface to detect a valid signal associated with the traffic, wherein the monitoring is performed until the valid signal is detected to trigger the initiation of the alarm process.

4. The method according to claim 1, wherein the UNI is among a plurality of UNIs interfacing the service provider transport network, the service provider transport network including a plurality of Ethernet virtual circuits, one of the virtual circuits having a corresponding network-to-network interface (NNI) for transporting traffic from the particular network interface device.

5. The method according to claim 1, wherein the service provider transport network is managed by a wholesaler provider, and the network interface device is located at a premise of retail provider, the method further comprising:
forwarding the traffic over the virtual circuit to another user network interface for delivery of the traffic to an end user network.

6. The method according to claim 1, wherein the Ethernet virtual circuit is among a plurality of Ethernet virtual circuits established over the service provider transport network.

7. An apparatus comprising:
at least one processor; and
at least one memory including computer program code for one or more programs, the at least one memory and the computer program code configured to, with the at least one processor, cause the apparatus to perform at least the following,
receive traffic at a particular network interface device configured to interface an Ethernet virtual circuit of a service provider transport network over a user network interface (UNI), wherein the particular network interface device is configured as a demarcation point between a customer network and the service provider transport network,
perform circuit replication over the virtual circuit to create a plurality of communication paths over the virtual circuit by assigning respective tags to create duplicate traffic streams for the virtual circuit,
wherein the tags are inserted into the duplicate traffic streams for independently switching the duplicate traffic streams over the plurality of communication paths of the virtual circuit,
wherein the plurality of communication paths of the virtual circuit connect to a host network via a first single common router on a host side, and connect to a user network via a second common router on an end user side.

8. The apparatus according to claim 7, wherein the apparatus is further caused to:
detect, at the network user interface, whether the traffic is valid traffic for a particular customer; and
initiate an alarm process if the traffic is valid.

9. The apparatus according to claim 8, wherein the apparatus is further caused to:
monitor one or more ports of the network user interface to detect a valid signal associated with the traffic, wherein the monitoring is performed until the valid signal is detected to trigger the initiation of the alarm process.

10. The apparatus according to claim 7, wherein the UNI is among a plurality of UNIs interfacing the service provider transport network, the service provider transport network including a plurality of Ethernet virtual circuits, one of the virtual circuits having a corresponding network-to-network interface (NNI) for transporting traffic from the network interface device.

11. The apparatus according to claim 7, wherein the service provider transport network is managed by a wholesaler provider, and the network interface device is located at a premise of retail provider, the apparatus being further caused to:
forward the traffic over the virtual circuit to another user network interface for delivery of the traffic to an end user network.

12. The apparatus according to claim 7, wherein the Ethernet virtual circuit is among a plurality of Ethernet virtual circuits established over the service provider transport network.

13. A system comprising:
a plurality of network interface devices configured to interface one or more user network interfaces (UNIs) of a service provider transport network that provides transport services to a plurality of customer networks, wherein the service provider transport network includes a plurality of Ethernet virtual circuits, each of the network interface devices is configured as a demarcation point between a customer network and the service provider transport network,
wherein one of the network interface devices is further configured to perform circuit replication over one of the virtual circuits to create a plurality of communication paths over the one virtual circuit by assigning respective tags to create duplicate traffic streams for the virtual circuit,
wherein the tags are inserted into the duplicate traffic streams for independently switching the duplicate traffic streams over the plurality of communication paths of the virtual circuit,
wherein the plurality of communication paths of the virtual circuit connect to a host network via a first single common router on a host side, and connect to a user network via second common router on an end user side.

14. The system according to claim 13, wherein one of the network interface devices is further configured to detect whether the traffic is valid traffic for a particular customer; and to initiate an alarm process if the traffic is valid.

15. A system The system according to claim 14, wherein one of the network interface devices is further configured to monitor one or more ports of the network user interface to detect a valid signal associated with the traffic, and the monitoring is performed until the valid signal is detected to trigger the initiation of the alarm process.

16. The system according to claim 13, wherein one of the virtual circuits has a corresponding network-to-network interface (NNI) for transporting traffic from the one of the network interface devices.

17. The system according to claim 13, wherein the service provider transport network is managed by a wholesaler provider, and the network interface device is located at a premise of retail provider and is further configured forward the traffic over the virtual circuit to another user network interface for delivery of the traffic to an end user network.

* * * * *